United States Patent [19]
Chen

[11] Patent Number: 5,715,158
[45] Date of Patent: Feb. 3, 1998

[54] METHOD AND APPARATUS FOR CONTROLLING AN EXTENDED PROCESS

[75] Inventor: Shih-Chin Chen, Dublin, Ohio

[73] Assignee: ABB Industrial Systems, Inc., Columbus, Ohio

[21] Appl. No.: 656,672

[22] Filed: May 31, 1996

[51] Int. Cl.$^6$ .................................................. G05B 13/04
[52] U.S. Cl. .................... 364/150; 364/137; 364/469.01; 364/471.01
[58] Field of Search ........................... 364/137, 148–150, 364/164, 165, 160, 180, 176, 177, 469.01, 471.01–471.03, 472.06, 468.28; 162/262, 252, 253, 263, DIG. 10

[56] References Cited

U.S. PATENT DOCUMENTS

| | | | |
|---|---|---|---|
| 3,758,762 | 9/1973 | Littman et al. | 364/165 |
| 4,080,656 | 3/1978 | Jonsson et al. | 364/137 |
| 4,151,589 | 4/1979 | Ross | 364/137 |
| 4,174,618 | 11/1979 | Jenkins, Jr. et al. | 60/66 X |
| 4,874,467 | 10/1989 | Karlsson et al. | 162/198 |
| 5,032,977 | 7/1991 | Beller et al. | 364/471.02 |
| 5,121,332 | 6/1992 | Balakrishnan et al. | 364/471 |
| 5,400,247 | 3/1995 | He | 364/148 |

OTHER PUBLICATIONS

Carlos E. Garcia and Manfred Morari, *Internal Model Control. 1. A Unifying Review and Some New Results*, Industrial Engineerng Chemical Process Design Development, vol. 21, No. 2, American Chemical Society, 1982.

*Primary Examiner*—Reba I. Elmore
*Assistant Examiner*—Steven R. Garland
*Attorney, Agent, or Firm*—Killworth, Gottman, Hagan & Schaeff, L.L.P.

[57] ABSTRACT

Sensors are spaced along an extended process from its beginning end to its finishing end. Each sensor is associated with a parallel inferential control loop (PICL) and generates an actual measurement signal for a portion of the process. Each PICL includes a process model emulating the sensed portion of the process with the process models being cascaded from the beginning end through and including the finishing end. Each PICL generates a loop control signal corresponding to its sensed portion of process with the loop control signals from the PICLs being summed to generate a total control signal which controls a control element at the beginning end of the process and also is received by the first or most up-stream process model. The process models produce expected measurement signals which are combined with the actual measurement signals to determine difference signals for each PICL which includes a reset model emulating the sensed portion of the process. Each reset model receives a reset input signal from a preceding PICL and generates a reset output signal to decouple control of preceding PICLs from the PICL receiving the reset input signal. One or more of the PICLs can be disabled provided its deviation signal and setpoint signal are nullified, its reset output signal is routed to be the reset input signal for the succeeding PICL and any setpoint signal for the loop is converted and transferred from the disabled loop to a preceding loop.

18 Claims, 5 Drawing Sheets

METHOD AND APPARATUS FOR CONTROLLING AN EXTENDED PROCESS

BACKGROUND OF THE INVENTION

The present invention relates in general to controlling an extended process and, more particularly, to a method and apparatus for controlling an extended process such that a number of intermediate corrections can be made to the control without coupling those corrections into down-stream control of the process. While the present invention is generally applicable to a variety of extended processes, it will be described herein with reference to a web forming machine. More particularly, the invention of the present application will be described with reference to a paper making machine wherein a paper web is processed along an extended process path from a headbox dispensing pulp slurry at one end of the path to a reel which accumulates the finished paper web at the other end of the path.

In paper making machines as well as other web forming machines, a paper web or other web product being produced normally travels a substantial distance along a path extending from a process beginning end of the machine, where raw materials enter the machine, to a product finishing end of the machine, where the finished product is removed. Control or actuator elements which execute control commands for such machines are typically found at the beginning ends of the machines. For example, in a paper making machine, a stock valve or pump, which controls the flow of pulp slurry into a headbox of a paper making machine, is a key control element for determining the paper weight at the finishing end of the machine.

The effect of the control elements typically is not detected until the final product is measured close to the finishing end of the machine. In extended process machines, there is a substantial transport delay time and/or cascaded dynamic responses between the two opposite ends of the process. Accordingly, disturbances occurring near the beginning or up-stream end of the process will not be detected and compensated soon enough by sensors located at the finishing or down-stream end of the process to achieve a higher degree of quality uniformity or avoid production disruption, for example, a sheet break on a paper making machine.

Even though modern machines usually operate at faster speeds than their forerunners, their transport delay times are still substantially longer than their overall system time constants. Much longer transport delays are also common for machines that produce heavier weight paper, for example, linerboard and kraftpaper. It is apparent that the ability to control such processes is severely limited by the extensive time delays, known as dead time, between control elements at the beginning ends of the processes and measurements performed at the finishing ends of the processes.

As a way of improving process controllability, one or more extra sensors can be installed along the extended process for taking intermediate measurements. The intermediate measurements can detect process disturbances much sooner than finishing end sensors. Feedback control systems that incorporate intermediate measurements which do not have such long dead time delays are more responsive to better compensate up-stream process disturbances. Unfortunately, the intermediate sensors usually indicate the quality of semi-finished products or intermediate process conditions such that the quality of final or finished products still needs to be determined from finishing end sensors.

In view of these problems usually, a conventional cascade multi-loop control system has been used to account for measurements taken by multiple sensors. Unfortunately, in cascade control systems, there is no coordination among multiple loops other than setting the outer loop controller response time to be much slower than the inner loop controller response time. Accordingly, cascade control systems often act either over aggressively when tuned too tightly with resulting duplicated control actions or too conservatively when tuned to decouple the interacting loops.

It is, thus, apparent that there is a need for an arrangement for controlling extended processes which is responsive to intermediate measurements of the process and also finishing end measurements without over correcting for disturbances which are encountered during operation of the processes.

SUMMARY OF THE INVENTION

This need is met by the method and apparatus of the present invention wherein one or more feedback corrections can be made between the beginning and finishing ends of an extended process without coupling the corrections into down-stream control of the extended process. A sensor is located at each of one or more intermediate locations between the beginning end and the finishing end of the process with a final or finished end sensor being located at the finishing end.

Each sensor is associated with a parallel inferential control loop and generates an actual measurement signal representative of the process at the sensor location. Each parallel inferential control loop corresponds to a portion of the extended process and includes a process model which emulates the portion of the extended process monitored by its associated sensor. The process models are cascaded from the beginning end of the process through the intermediate locations of the process and the finishing end of the process. Each parallel inferential control loop generates a loop control signal corresponding to that portion of the extended process monitored by its associated sensor. The loop control signals from the parallel inferential control loops are summed to generate a total control signal which controls one or more control elements at the beginning end of the extended process and also is received by the first or most up-stream process model. In this way, the process models produce expected measurement signals for each of the inferential control loops. The actual and expected measurement signals are combined to determine difference signals for each parallel inferential control loop.

Each parallel inferential control loop includes a reset model which emulates the portion of the extended process monitored by its associated sensor. Each reset model receives a reset input signal from a parallel inferential control loop which controls a preceding portion of the extended process and generates a reset output signal. The reset output signal decouples control of preceding parallel inferential control loops from the parallel inferential control loop receiving the reset input signal. The reset input signal for each reset model is either the difference signal or the reset output signal from the preceding parallel inferential control loop depending upon whether the preceding parallel inferential control loop is turned on or off, respectively. If no such preceding parallel inferential control loop exists, the reset input signal is set to zero.

One or more of the parallel inferential control loops for the intermediate and finishing end locations can be disabled provided its reset output signal is routed to be the reset input signal for the succeeding parallel inferential control loop and any setpoint signal or target input for the loop is converted and transferred from the disabled loop to a preceding loop.

In accordance with one aspect of the present invention a parallel inferential control loop for controlling a portion of an extended process comprises a process model corresponding to the portion of the extended process which is monitored by a process sensor generating an actual measurement signal for the portion of the process. The process model receives a signal representative of control or a process model output preceding the portion of the extended process and for generating an expected measurement signal. A first summer combines the actual measurement signal and the expected measurement signal to generate a difference signal representative of the difference between the actual measurement signal and the expected measurement signal. A reset model corresponding to the portion of the extended process receives a reset input signal from a parallel inferential control loop controlling a preceding portion of the extended process and generates a reset output signal for decoupling control of the portion of the extended process from the preceding portion of the extended process. A second summer combines the difference signal and the reset output signal to generate a deviation signal, which, together with a setpoint signal for the portion of the process, is passed to a controller for generating a loop control signal for the portion of the extended process. A third summer sums the loop control signal and a control signal from a parallel inferential control loop controlling a succeeding portion of the extended process.

In the illustrated embodiment of the invention, the controller comprises a deviation filter for generating a filtered deviation signal, a setpoint shaping filter for generating a shaped setpoint signal, a fourth summer for combining the filtered deviation signal and the shaped setpoint signal to generate an inferential signal, and an inferential compensator responsive to the inferential signal for generating the loop control signal. For many applications, the process model is the same as the reset model.

In accordance with another aspect of the present invention, a control system for controlling an extended process including a process beginning end and a process finishing end comprises a finishing end parallel inferential control loop associated with a sensor positioned at the process finishing end for taking a finished process measurement of the extended process. The finishing end parallel inferential control loop generates a finished process control signal in response to the finished process measurement, an expected finished process measurement signal, a reset output signal and a setpoint signal. A first intermediate parallel inferential control loop is associated with a sensor positioned at a first intermediate location between the process beginning end and the process finishing end for taking a first intermediate measurement of the extended process. The first intermediate parallel inferential control loop generates a first intermediate loop control signal in response to the first intermediate measurement and an expected first intermediate measurement signal, and combines the first intermediate loop control signal with the finished process control signal from the finishing end parallel inferential control loop to generate a total control signal for controlling the extended process at the beginning end thereof. The first intermediate parallel inferential control loop comprises a first intermediate process model for the portion of the extended process preceding the first intermediate location. The total control signal being an input to the first intermediate process model for generating the first intermediate expected measurement signal for the first intermediate parallel inferential control loop. The finishing end parallel inferential control loop comprises a finishing end process model for that portion of the extended process adjacent and preceding the finishing end of the extended process with the first intermediate expected measurement signal being cascaded to the finishing end process model for generating the finishing end expected measurement signal. A reset model for that portion of the extended process adjacent and preceding the finishing end of the extended process receives a reset input signal equal to the difference between the first intermediate measurement and an expected first intermediate measurement signal of the first intermediate parallel inferential control loop for generating the reset output signal.

In accordance with yet another aspect of the present invention, a control system for controlling an extended process including a process beginning end and a process finishing end comprises a plurality of parallel inferential control loops positioned at spaced locations ranging from the beginning end of the extended process to the finishing end of the extended process. Each of the parallel inferential control loops comprises a process model corresponding to a portion of the extended process associated with the parallel inferential control loop for receiving a signal representative of control or a process model output preceding the portion of the extended process and for generating an expected measurement signal. A first summer receives the expected measurement signal and a measurement signal from a sensor associated with the parallel inferential control loop and generates a difference signal. A reset model corresponding to the portion of the extended process receives a reset input signal from a parallel inferential control loop controlling a preceding portion of the extended process and generates a reset output signal for decoupling control of the portion of the extended process from the preceding portion of the extended process. A second summer combines the difference signal and the reset output signal to generate a deviation signal which, together with a setpoint signal for the monitored portion of the process, is passed to a controller to generate a loop control signal for the portion of the extended process. A third summer sums the loop control signal and a control signal representative of control of all parallel inferential control loops controlling succeeding portions of the extended process.

In accordance with still another aspect of the present invention, a method for controlling an extended process including a process beginning end and a process finishing end by means of a plurality of parallel inferential control loops comprises the steps of: generating actual measurement signals for spaced locations ranging from the beginning end of the extended process to the finishing end of the extended process, the spaced locations each corresponding to one of the plurality of parallel inferential control loops; generating expected measurement signals for the spaced locations of the extended process; combining the actual measurement signals and the expected measurement signals to generate difference signals; generating reset output signals representative of deviations compensated by preceding parallel inferential control loops; combining the difference signals and the reset output signals to generate deviation signals; combining the deviation signals with setpoint signals to generate control signals for each of the parallel inferential control loops; and, combining the control signals to generate a total control signal for control of the extended process at the beginning end of the extended process.

One or more parallel inferential control loops can be deactivated in a control system including a plurality of parallel inferential control loops with the system operating with at least one remaining control loop which remains active. Each deactivated control loop must pass the reset output signal for the deactivated parallel inferential control loop to a succeeding parallel inferential control loop and convert the setpoint signal for the deactivated parallel control loop to a setpoint signal for a preceding parallel inferential control loop.

It is, thus, an object of the present invention to provide a method and apparatus for controlling an extended process such that a number of intermediate corrections can be made to the control without coupling those corrections into downstream control of the process; to provide a method and apparatus for controlling an extended process wherein reset models receive input reset signals from up-stream portions of the extended process for decoupling corrections made at those up-stream portions from down-stream control of the process; and, to provide a method and apparatus for controlling an extended process wherein a plurality of parallel inferential control loops located at spaced locations along the process are intercoupled such that one or more control loops can be deactivated with at least one active control loop maintaining control of the process.

Other objects and advantages of the invention will be apparent from the following description, the accompanying drawings and the appended claims.

BRIEF DESCRIPTION OF THE DRAWINGS

FIG. 1B is placed to the right of FIG. 1A, form is a schematic block diagram of a generalized control system in accordance with the present invention for controlling a stock valve of a paper making machine in response to measurements taken at the finishing end and at a plurality of locations between the beginning end and the finishing end of the paper making machine;

FIG. 4 is a schematic block diagram of the generalized parallel inferential control loop of FIG. 2 shown with the control loop turned on;

DETAILED DESCRIPTION OF THE INVENTION

Figure 1A:
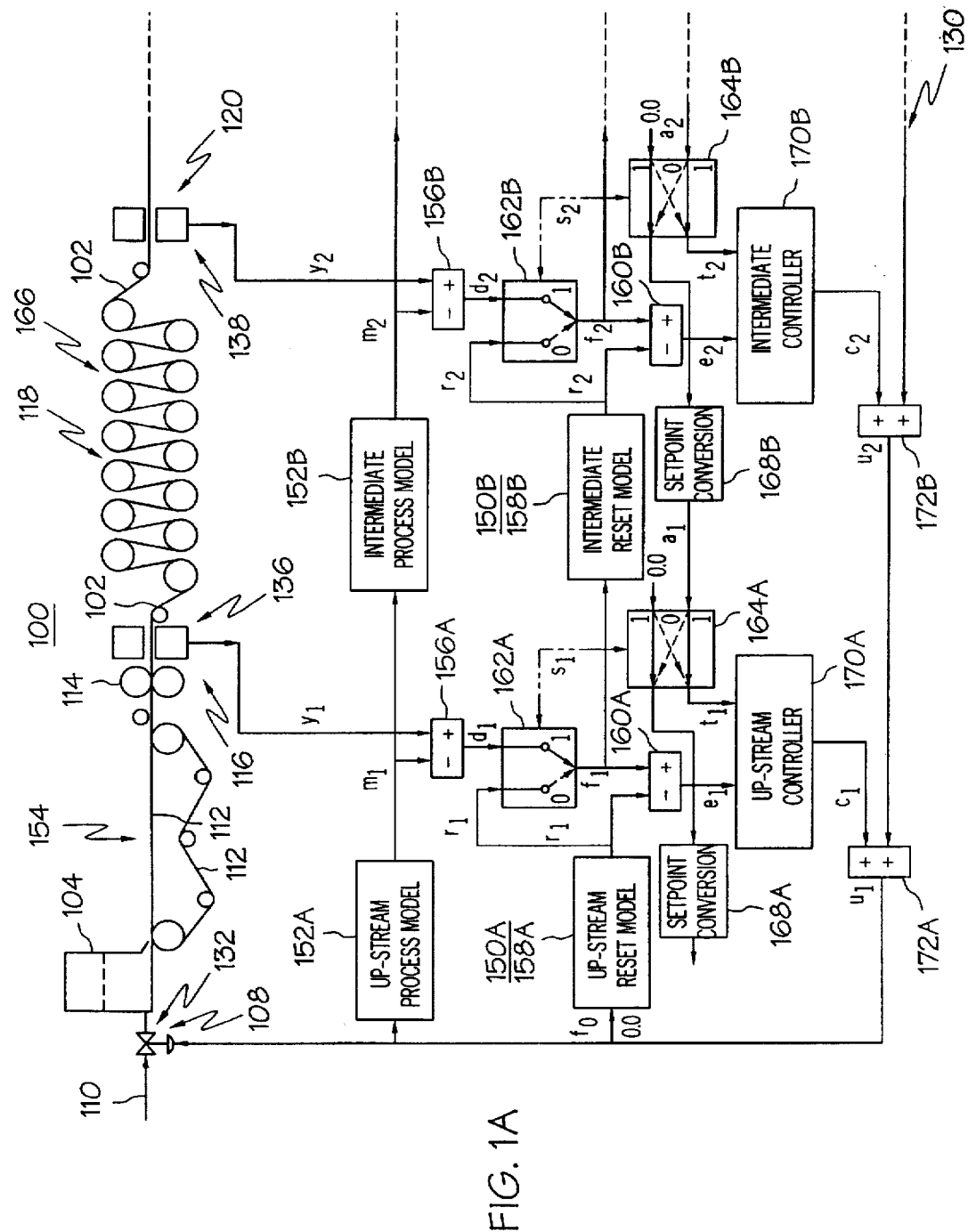
FIGS. 1A and 1B, when
Figure 1B:
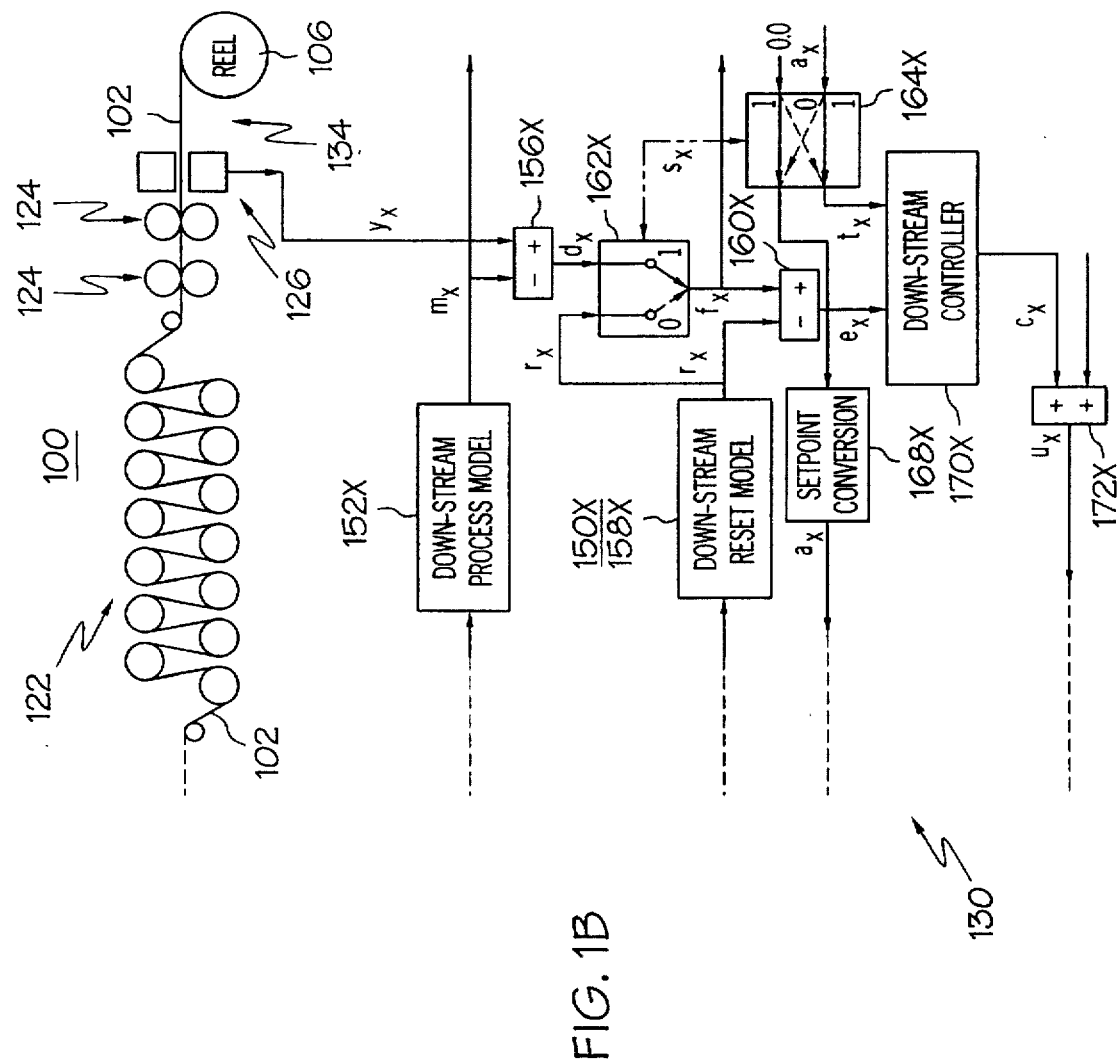

The invention of the present application will now be described with reference to the drawing figures. While the present invention is generally applicable to a variety of extended processes, it is initially being applied to a web forming method and machine and, more particularly, to a paper making machine. Accordingly, the description will be with reference to a paper making machine 100 wherein a paper web 102 is processed along an extended process path stretching from a headbox 104 which dispenses pulp slurry at the beginning end of the path to a reel 106 which accumulates the finished paper web 102 at the finished end, as shown in FIGS. 1A and 1B. For sake of simplicity, the control system of the present application will be described with reference to control of a stock valve 108 which controls the flow of pulp slurry 110 to the headbox 104.

The headbox 104 distributes pulp slurry onto a forming wire 112. The paper web 102 passes from the wire 112 to a press section 114, a first or intermediate process sensor 116, a first dryer section 118, a second or intermediate sensor 120, a second dryer section 122, a finishing section 124, a final or finished sensor 126, and finally, to the pickup reel 106 upon which the paper web 102 is accumulated. Additional processing stations and sensors can be located between the intermediate sensor 120 and the finished sensor 126 as indicated by the dashed lines between the intermediate sensor 120 and the second dryer section 122 in the diagram of FIGS. 1A and 1B. Any appropriate sensors, for example nuclear radiation and optical sensors, can be used in the present invention with the sensors measuring a single point across the web 102 or the full width of the web 102. The sensors can be scanning sensors or stationary sensors depending upon the application. Such sensors are well known in the art and will not be described herein.

In accordance with the present invention, a control system 130 controls an extended process, such as the paper making machine 100. The process includes at least one intermediate location between the beginning end 132 of the process adjacent to the headbox 104 and the finishing end 134 of the process adjacent to the pickup reel 106, with two intermediate locations, first and second intermediate locations 136, 138, being shown in FIGS. 1A and 1B. The sensor 116 is positioned at the first intermediate location 136 to take a first intermediate or first up-stream measurement of the paper web 102 at the location 136 and the sensor 126 is located adjacent to the reel 106 to take a finished measurement at a location coinciding with the finishing end 134 and before the paper web 102 is taken up by the reel 106. Additional sensors can be positioned at intermediate locations between the first intermediate location 136 and the finishing end location 134. While any reasonable number of intermediate sensors can be used for control of a given process, only one such sensor, the sensor 120 positioned at the second intermediate location 138, is illustrated in FIGS. 1A and 1B for taking a second intermediate measurement.

The control system 130 is made up of a plurality of control loops which are referred to herein as parallel inferential control loops 150A, 150B–150X because each control loop processes signals relating to a portion of the extended process with which the control loop is associated based on inferred or expected characteristics of that portion of the extended process and process/reset models are arranged in parallel throughout the control loops. The parallel inferential control loops 150A–150X are associated with and connected to sensors positioned at locations along the extended process where measurements can be taken. Thus, the first parallel inferential control loop 150A is connected to the sensor 116, the second parallel inferential control loop 150B is connected to the sensor 120 and the xth or finishing end parallel inferential control loop 150X is connected to the sensor 126 at the finishing end 134 of the extended process.

Control loops preceding the last, finishing end or xth parallel inferential control loop 150X may also be referred to as intermediate parallel inferential control loops since they are associated with sensors positioned at intermediate locations between the first intermediate location 136 and the finishing end location 134. Accordingly, the first parallel inferential control loop 150A may also be referred to as the first intermediate parallel inferential control loop 150A and so on.

Each of the inferential control loops 150A–150X functions in substantially the same way such that only the operation of the first inferential control loop 150A will be described in detail. Corresponding elements of each control loop will be labeled with the same numerals suffixed with a letter identifying the particular control loop.

The inferential control loops 150A-150X can be turned on and off as required for a given control application, to service faulty control loops or for maintenance purposes. It is noted that the control system 130 can operate on only one inferential control loop or any combination of the control loops 150A-150X. However, overall performance of the control system 130 is degraded as more parallel inferential control loops are turned off or inactivated. When one of the parallel inferential control loops 150A-150X is to be turned off, certain signals are switched to maintain operation of the control system 130 and to effectively disable or inactivate the control loop thereby turning it off as will be described. Of course, other loop turn off or deactivation arrangements can be used in the present invention as will be apparent.

The up-stream or first parallel inferential control loop 150A includes a process model 152A corresponding to a portion 154 of the extended process which is monitored by the process sensor 116, i.e., the portion of the process extending from the beginning end 132 to the first intermediate location 136. The sensor 116 generates an actual measurement signal $y_1$ representative of the portion 154. The process model 152A receives a signal representative of control preceding the portion 154 of the extended process for generating an expected measurement signal $m_1$ which is passed to a first summer 156A and to a process model 152B of the succeeding parallel inferential control loop 150B to begin a cascade of process models for all the parallel inferential control loops 150A-150X. In the case of the first parallel inferential control loop 150A, a total control signal $u_1$ generated by the control system 130 is received by the process model 152A. The first summer 156A combines the actual measurement signal $y_1$ and the expected measurement signal $m_1$ to generate a difference signal $d_1$ representative of the difference between the actual measurement signal $y_1$ and the expected measurement signal $m_1$.

A reset model 158A corresponding to the portion 154 of the extended process receives a reset input signal $f_o$ from a parallel inferential control loop for controlling a preceding portion of the extended process and generating a reset output signal $r_1$ for decoupling control of the portion 154 of the extended process from the preceding portion of the extended process. In the case of the first parallel inferential control loop 150A, there is no preceding portion and hence $f_0$ is set equal to zero. The reset model 158A and the process model 152A can be different from one another for a given application; however, commonly they will be the same. For some portions of the process the reset and process models can be only a delay if no substantial process dynamics occur for those portions.

It should be apparent that the reset model 158A of the first parallel inferential control loop 150A can be eliminated; however, it is shown to illustrate the modularity produced when all parallel inferential control loops 150A-150X are the same except that each control loop is tailored for the portion of the process with which it is associated. The parallel inferential control loops can be implemented in either hardware or software. While software implementation is currently preferred, there can be advantages of economy to making all parallel inferential control loops 150A-150X the same whether the control loops 150A-150X are implemented in hardware or software.

A second summer 160A combines the difference signal $d_1$ and the reset output signal $r_1$ to generate a deviation signal $e_1$ which is the difference between the difference signal $d_1$ and the reset output signal $r_1$. First and second switches 162A, 164A are provided for switching the parallel inferential control loop 150A on (1, solid line connection) and off (0, dashed line connection) as will be described. As illustrated in FIG. 1A, the control loop 150A is turned on such that the difference signal $d_1$ passes through the switch 162A and is passed to the second summer 160A. While the parallel inferential control loop 150A is turned on, the difference signal $d_1$ also serves as the reset input signal $f_1$ for a reset model 158B of the parallel inferential control loop 150B corresponding to the portion 166 of the extended process which extends between the sensor 116 and the sensor 120.

A target or setpoint signal $t_1$ is passed through the switch 164A from a setpoint converter 168B of the parallel inferential control loop 150B. The setpoint converters 168B-168X of the parallel inferential control loops 150B-150X convert either a setpoint signal $a_1$ through $a_x$ or a zero signal, whichever is received from the switch 164A, to an appropriate setpoint signal for the preceding control loop. For example a slope, $a_1-a_{x-1}$, and offset conversion may be used for the paper making machine 100 as represented by the following equation for the ith section setpoint converter 168I:

$$a_{i-1} = v_i a_i + o_i$$

where $a_{i-1}$ is the setpoint signal for the preceding control loop, $v_i$ is the setpoint conversion ratio or slope and $o_i$ is the setpoint conversion offset or bias. However, any appropriate setpoint conversion can be performed for a given application. A series of successive setpoint conversions can be made if a series of control loops are turned off. It is noted that if any succeeding parallel inferential control loop is turned on, the setpoint signal $t_1$ will be zero.

A setpoint converter 168A is included in the control loop 150A even though there is no up-stream or preceding control loop. Here again, as with the reset model 158A, the setpoint converter 168A of the first parallel inferential control loop 150A can be eliminated; however, it is shown to illustrate the modularity produced when all parallel inferential control loops 150A-150X are substantially the same. As noted earlier, there can be advantages of economy to making all parallel inferential control loops 150A-150X the same whether the control loops 150A-150X are implemented in hardware or software.

Figure 3:
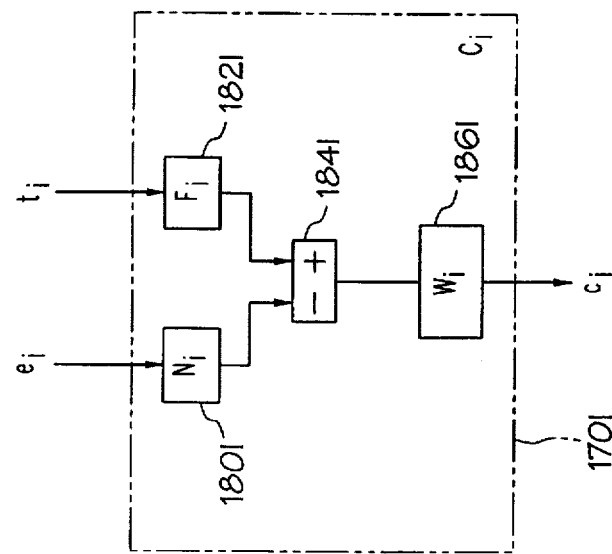
FIG. 3 is a schematic block diagram of a controller of the generalized parallel inferential control loop of FIG. 2.

A controller 170A, see also FIG. 3, receives the deviation signal $e_1$ and the setpoint signal $t_1$ for the portion 154 of the extended process to generate a loop control signal $c_1$ for the portion 154 of the extended process. A third summer 172A sums the loop control signal $c_1$ and a control signal $u_2$ received from a control loop which controls a succeeding portion of the extended process, such as the parallel inferential control loop 150B, to generate the total control signal $u_1$ which controls the stock valve 108 and is passed to the process model 152A as noted above. As illustrated in FIG. 1A, the control signal $u_2$ is a subtotal control signal resulting from summing all loop control signals $c_2-c_x$ from downstream or succeeding control loops, i.e., the control loops 150B-150X, which are turned on.

Figure 6:
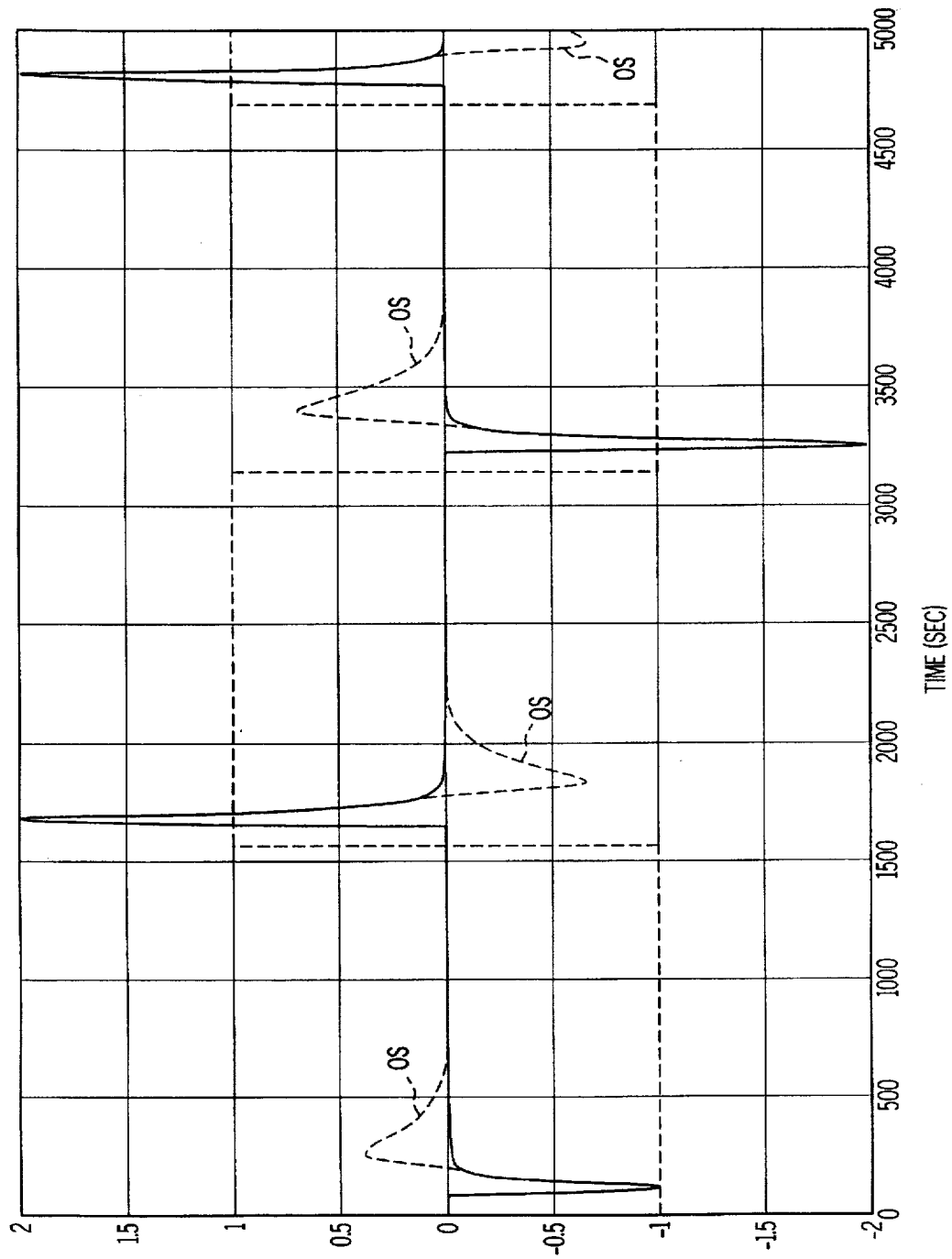
FIG. 6 is a graph illustrating over correction of a process which can occur, for example with a cascade multi-loop control system, as contrasted with the correction provided by a control system in accordance with the present invention.

In the invention of the present application, for example as illustrated in FIGS. 1A and 1B, the intermediate parallel inferential control loops from the control loop 150A down to but not including the last parallel inferential control loop 150X quickly compensate up-stream disturbances represented by difference signals $d_1-d_{x-1}$ detected by intermediate sensors represented by the sensors 116, 120. The detected disturbances are fed forward through reset models, e.g., the reset models 158A, 158B, to generate reset output signals, e.g., the reset output signal $r_2$, for decoupling compensated disturbances from disturbances detected by sensors which are down-stream, e.g., the finished sensor 126. The parallel arrangement of process models and reset models substantially prevents overlapping control actions which can over compensate for disturbances detected in up-stream portions of the extended process and hence avoid overshoot problems, shown by the dashed signal peaks OS shown in FIG. 6, which are commonly encountered in cascade control systems.

Figure 2:
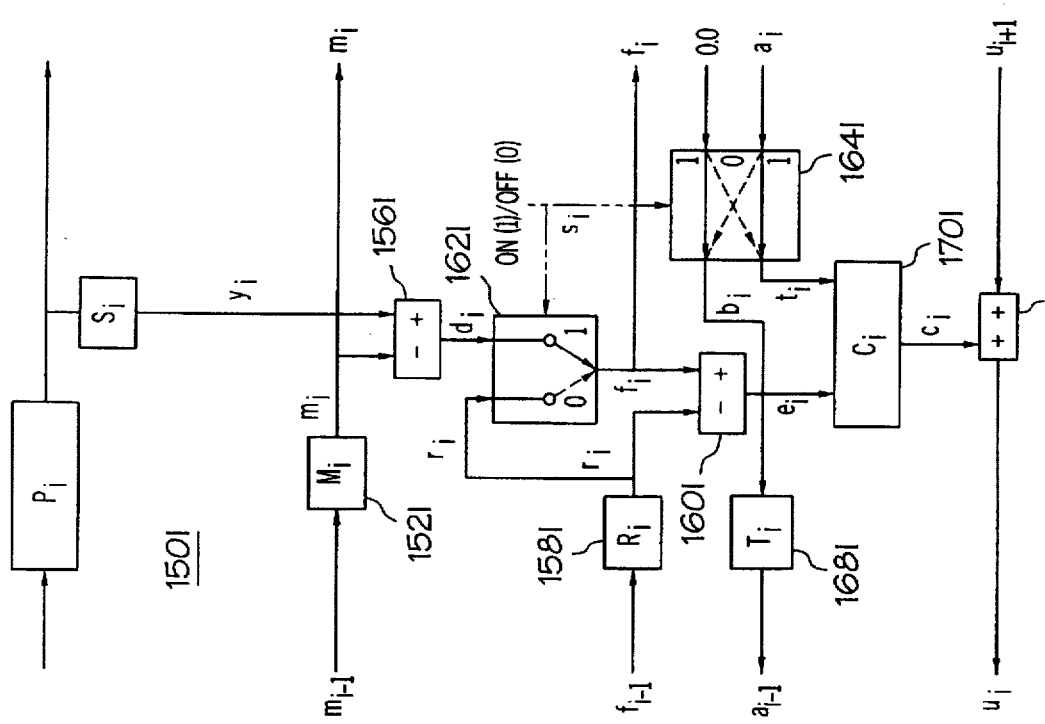
FIG. 2 is a schematic block diagram of a generalized parallel inferential control loop as used in the control system of FIGS. 1A and 1B.

For sake of clarity, FIG. 2 is a schematic block diagram of a generalized parallel inferential control loop 150I for use in an extended process. The portion of an extended process, which can be any extended process to be controlled by the control system of the present application, is indicated by $P_i$ which is monitored by a sensor $S_i$ appropriate for the process. The remaining elements of the generalized parallel inferential control loop 150I operate as described above and are identified in the same manner as the control loops 150A–150X of FIGS. 1A and 1B. Representative transfer functions for the ith section of a process such as the paper making machine 100, the corresponding process model and reset model will now be given. The representative transfer function for the dynamics of the ith section process $P_i(s)$ is:

$$P_i(s) = \frac{K_{p_i} e^{-D_{p_i}S}}{\tau_{p_i}S + 1}$$

where s is the Laplace transform operator, $K_{p_i}$ is the process gain for the ith section of the extended process, $\tau_{p_i}$ is the process time constant for the ith section of the extended process if that section can be approximated with a first-order dynamic response and $D_{p_i}$ is the process dead time or delay for the ith section of the extended process.

The transfer function for the process model $M_i(s)$ of the ith section process $P_i(s)$ is:

$$M_i(S) = \frac{K_{m_i} e^{-D_{m_i}s}}{\tau_{m_i}S + 1}$$

where s is the Laplace transform operator, $K_{m_i}$ is the process model gain for the ith section of the extended process, $\tau_{m_i}$ is the process model time constant for the ith section of the extended process and $D_{m_i}$ is the process model dead time or delay for the ith section of the extended process.

The transfer function for the reset model $R_i(s)$ of the ith section process $P_i(s)$ is:

$$R_i(S) = \frac{K_{m_i} e^{-D_{m_i}s}}{\tau_{m_i}S + 1}$$

where s is the Laplace transform operator, $K_{m_i}$ is the reset model gain for the ith section of the extended process, $\tau_{m_i}$ is the reset model time constant for the ith section of the extended process and $D_{m_i}$ is the reset model dead time or delay for the ith section of the extended process.

The controller $C_i$ 170I, which is the same as the controllers 170A–170X of FIGS. 1A and 1B, is illustrated in schematic block diagram form in FIG. 3. The controller 170I includes a deviation filter 180I which filters high frequency noise from the deviation signal $e_i$ which is received from the second summer 160L. A setpoint shaping filter 182I shapes any input setpoint signal $t_i$ or produces an appropriate setpoint trajectory for the controller 170I. The filtered deviation signal $e_i$ and the shaped setpoint signal $t_i$ are combined by a fourth summer 184I to generate an inferential signal which is passed to an inferential compensator 186I to produce the loop control signal $c_i$.

To further illustrate the invention of the present application when used for control of the paper making machine 100, transfer functions for the deviation filter 180I, the setpoint shaping filter 182I and the inferential compensator 186I will now be given for the ith section controller 170I. The transfer function $N_i(s)$ for the deviation filter 180I for the ith section controller 170I is:

$$N_i(S) = \frac{1}{\tau_{ni}S + 1}$$

or $$N_i(S) = \frac{(\tau_{CLi}S + 1)^j}{((\tau_{CLi} + \tau_{ni})S + 1)^j}$$

Where $N_i(s)$ is the ith section deviation filter transfer function, s is the Laplace transform operator, $\tau_{ni}$ is the filter time constant for feedback deviation and $\tau_{CLi}$ is the closed loop response time constant specified in the ith inferential compensator 186I. The transfer function for the setpoint shaping filter 182I for the ith section controller 170I is:

$$F_i(S) = \frac{1}{\tau_{fi}S + 1}$$

Where s is the Laplace transform operator, $F_i(s)$ is the ith section setpoint shaping filter transfer function and $\tau_{fi}$ is the setpoint shaping or smoothing time constant. The transfer function for the inferential compensator 186I for the ith section controller 170I is:

$$W_i(S) = \frac{\prod_{j=1}^{i} (\tau_{mj}S + 1)}{(\tau_{CLi}S + 1)^i \prod_{j=1}^{i} k_{mj}}$$

Where s is the Laplace transform operator, $W_i(s)$ is the ith section inferential controller transfer function, $\tau_{mj}$ is the process model time constant, $\tau_{CLi}$ is the closed loop response time constant and $K_{mj}$ is the process model time constant.

In a more general case for control of an extended process, the ith section of process $P_i(s)$ may have more complicated higher order dynamics than the process of the paper making machine 100 as previously described. For the more general case, the process model $M_i(s)$ and reset model $R_i(s)$ can be represented as follows:

$$M_i(s) = R_i(s) = [M_{+i}(s)][M_{-i}(s)]$$

where $M_{+i}(s)$ contains any time delays and right-half zeros and is specified so that its steady-state gain is one (1). $M_{-i}(s)$ contains higher order, minimum phase dynamics. For this general case, the ith inferential compensator can be represented as:

$$W_i(S) = \frac{\prod_{j=1}^{i} [M_{-j}(S)]^{-1}}{(\tau_{CLi}S + 1)^{k_i}}$$

where $k_i$ is the total dynamic order of $M_{-j}(s)$ for j from 1 to i and $\tau_{CLi}$ is the closed loop response time constant.

Figure 5:
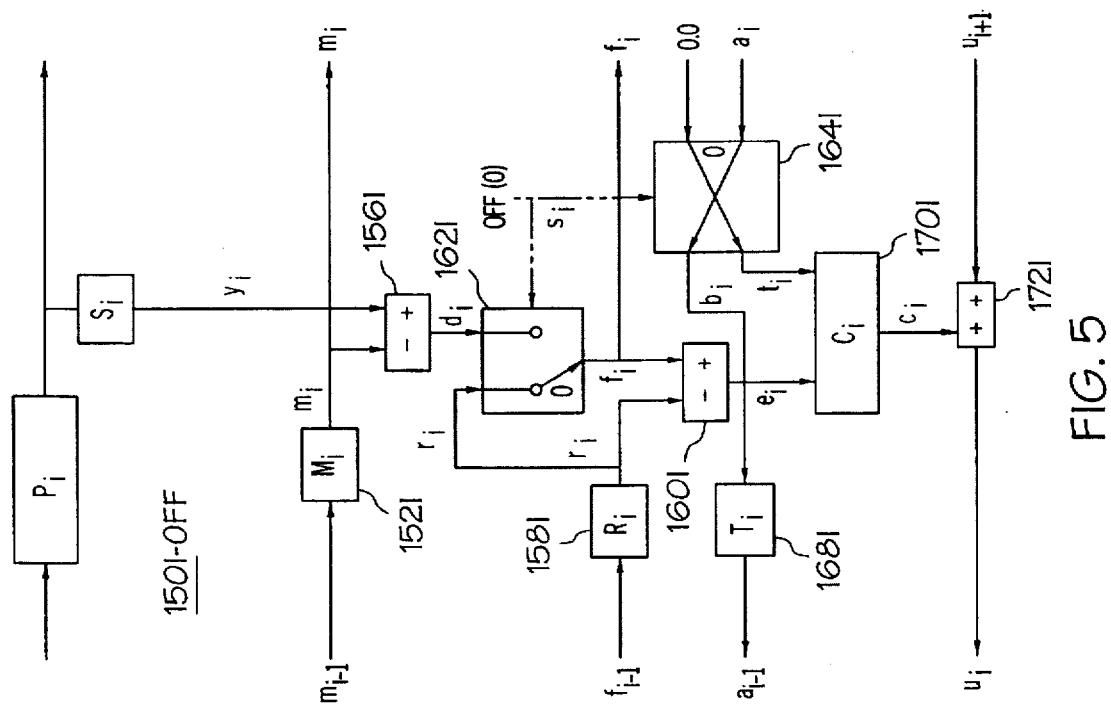
FIG. 5 is a schematic block diagram of the generalized parallel inferential control loop of FIG. 2 shown with the control loop turned off or deactivated.
Figure 4:
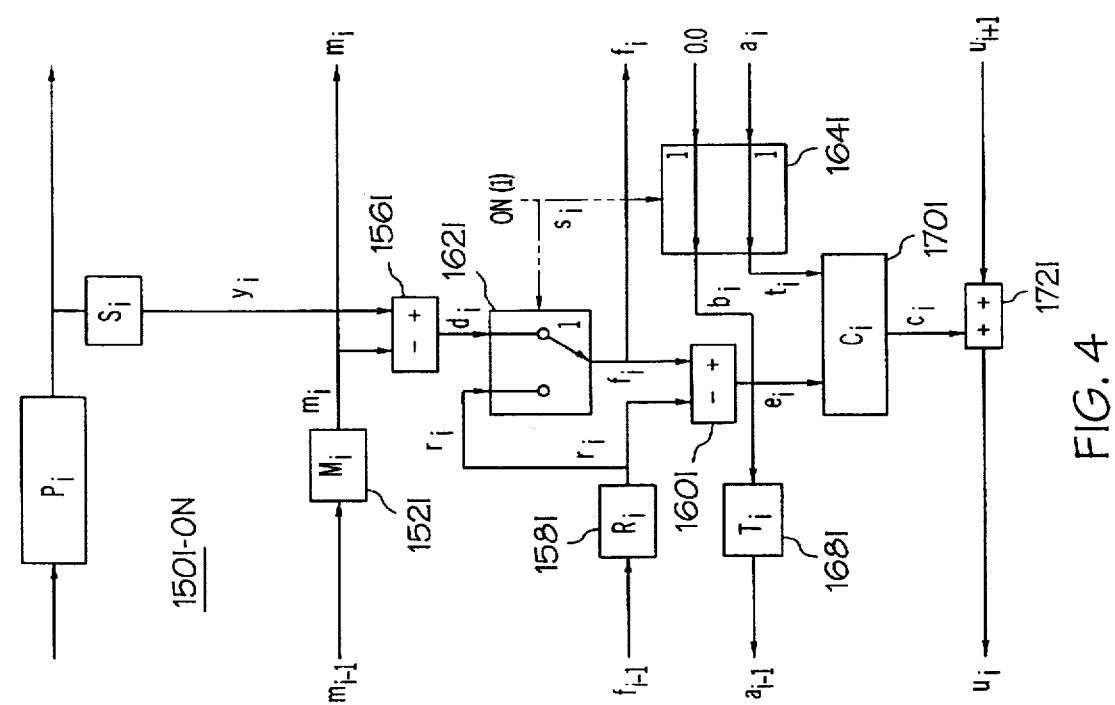

FIGS. 4 and 5 illustrate the on and off states, respectively, of the generalized parallel inferential control loop 150I of FIG. 2. In particular, the connections for the switches 162I and 164I to activate or turn the control loop 150I on are shown in FIG. 4 and to deactivate or turn the control loop 150I off are shown in FIG. 5. The operation of the control loop 150I when turned on is the same as the operation of the control loop 150A as described above. However, the difference signal $d_i$ and the reset output signal $r_i$ are switched to disable, deactivate or turn off the control loop 150I and the setpoint signal $a_i$ is connected through to setpoint converter 168I for conversion and passage to the preceding up-stream control loop I-1 to maintain operation of the control system 130.

In selecting between the difference signal $d_i$ and the reset output signal $r_i$, for example as illustrated by switching the difference signal $d_i$ and the reset output signal $r_i$, the second summer 160I receives the reset output signal $r_i$ on both inputs such that a zero deviation signal $e_i$ is passed to the controller 170I. When the setpoint signal $a_i$ is connected through to setpoint converter 168I, a zero signal is selected for the setpoint signal $t_i$ by the switch 164I such that the controller 170I generates a zero loop control signal $c_i$. It is thus apparent that the switches 162I, 164I and the second summer 160I form apparatus for nulling the loop control signal $c_i$ to turn off the parallel inferential control loop 150I. Even though the parallel inferential control loop 150I is turned off, the control system 130 continues to operate because any setpoint signal $a_i$ which is received by the control loop 150I is converted to a setpoint signal $a_{i-1}$ for the preceding up-stream control loop and the cascaded process models and reset models are not affected by turning off one or more of the control loops.

Having thus described the invention of the present application in detail and by reference to preferred embodiments thereof, it will be apparent that modifications and variations are possible without departing from the scope of the invention defined in the appended claims.

What is claimed is:

1. A parallel inferential control loop for controlling a portion of an extended process, said parallel inferential control loop comprising:

a process model corresponding to said portion of said extended process which is monitored by a process sensor which generates an actual measurement signal, said process model receiving a signal representative of control or process model output preceding said portion of said extended process and for generating an expected measurement signal;

a first summer for combining said actual measurement signal and said expected measurement signal to generate a difference signal representative of the difference between said actual measurement signal and said expected measurement signal;

a reset model corresponding to said portion of said extended process for receiving a reset input signal from a parallel inferential control loop for controlling a preceding portion of said extended process and generating a reset output signal for decoupling control of said portion of said extended process from said preceding portion of said extended process;

a second summer for combining said difference signal and said reset output signal to generate a deviation signal;

a controller for receiving said deviation signal and a setpoint signal for said portion of said extended process to generate a loop control signal for said portion of said extended process; and a third summer for summing said loop control signal and a control signal from a parallel inferential control loop for controlling a succeeding portion of said extended process.

2. A parallel inferential control loop for controlling a portion of an extended process as claimed in claim 1 wherein said parallel inferential control loop can be turned on and off and further comprises:

apparatus for nulling said loop control signal to turn off said parallel inferential control loop;

apparatus for selecting said difference signal as a reset input signal for succeeding parallel inferential control loops when said inferential control loop is turned on and for selecting said reset output signal as a reset input signal for succeeding parallel inferential control loops when said parallel inferential control loop is turned off; and a setpoint converter for converting said setpoint signal for said portion of said extended process to a setpoint signal for a preceding portion of said extended process.

3. A parallel inferential control loop for controlling a portion of an extended process as claimed in claim 1 wherein said loop can be turned on and turned off and said second summer receives said difference signal as a first input and said reset output signal as a second input, said parallel inferential control loop further comprising:

a first selector for selecting said difference signal and said reset output signal as said first input of said second summer, said difference signal being selected as said first input when said parallel inferential control loop is turned on and said reset output signal being selected as said first input when said parallel inferential control loop is turned off, said first input of said second summer serving as a reset input signal for a reset model for a succeeding portion of said extended process;

a setpoint converter for converting said setpoint signal for said portion of said extended process to a setpoint signal for a preceding portion of said extended process; and a second selector for routing said setpoint signal for said portion of said extended process to said controller when said parallel inferential control loop is turned on and for routing said setpoint signal for said portion of said extended process to said setpoint converter when said parallel inferential control loop is turned off.

4. A parallel inferential control loop for controlling a portion of an extended process as claimed in claim 1 wherein said controller comprises:

a deviation filter for generating a filtered deviation signal;

a setpoint shaping filter for generating a shaped setpoint signal;

a fourth summer for combining said filtered deviation signal and said shaped setpoint signal to generate an inferential signal; and an inferential compensator responsive to said inferential signal for generating said loop control signal.

5. A parallel inferential control loop for controlling a portion of an extended process as claimed in claim 4 wherein the inferential compensator for the ith portion of an extended web is represented by the transfer function:

$$W_i(S) = \frac{\prod_{j=1}^{i} (\tau_{mj}S + 1)}{(\tau_{ci}S + 1)^i \prod_{j=1}^{i} k_{mj}}$$

where s is the Laplace transform operator, $W_i(s)$ is the ith section inferential compensator transfer function, $\tau_{mj}$ is the process model time constant, $\tau_{CLi}$ is the closed loop response time constant and $K_{mj}$ is the process model time constant.

6. A parallel inferential control loop for controlling a portion of an extended process as claimed in claim 1 wherein said process model is the same as said reset model.

7. A parallel inferential control loop for controlling a portion of an extended process as claimed in claim 6 wherein the process model and the reset model for the ith portion of an extended web are represented by the transfer function:

$$M_i(S) = R_i(S) = \frac{K_{mi}e^{-D_{mi}s}}{\tau_{mi}S + 1}$$

where $M_i(s)$ is the process model, $R_i(s)$ is the reset model, $K_{mi}$ is the model gain, $D_{mi}$ is the model delay, s is the Laplace transform operator, e is base of natural logarithms and $\tau_{mi}$ is model time constant.

8. A parallel inferential control loop for controlling a portion of an extended process as claimed in claim 5 wherein the general process model and the general reset model for the ith portion of an extended web are represented by:

$$M_i(s) = R_i(s) = [M_{30\ i}(s)][M_{-i}(s)]$$

where $M_i(s)$ is the process model, $R_i(s)$ is the reset model, s is the Laplace transform operator, and $M_{+i}(s)$ contains any time delays and right=half zeros and is specified so that its steady-state gain is one (1) and $M_{-i}(s)$ contains higher order, minimum phase dynamics.

9. A parallel inferential control loop for controlling a portion of an extended process as claimed in claim 8 wherein the general inferential compensator for the ith portion of an extended web is represented by the transfer function:

$$W_i(S) = \frac{\prod_{j=1}^{i}[M_{-j}(S)]^{-1}}{(\tau_{CLi}S + 1)^{k_i}}$$

where $k_i$ is the total dynamic order of $M_{-j}(s)$ from 1 to i and $\tau_{CLi}$ is the closed loop response time constant.

10. A control system for controlling an extended process including a process beginning end and a process finishing end, said control system comprising:

a finishing end parallel inferential control loop associated with a sensor positioned at said process finishing end for taking a finished process measurement of said extended process, said finishing end parallel inferential control loop generating a finished process control signal in response to said finished process measurement, an expected finished process measurement signal, a reset output signal and a setpoint signal;

a first intermediate parallel inferential control loop associated with a sensor positioned at a first intermediate location between said process beginning end and said process finishing end for taking a first intermediate measurement of said extended process, said first intermediate parallel inferential control loop generating a first intermediate loop control signal in response to said first intermediate measurement and an expected first intermediate measurement signal, and combining said first intermediate loop control signal with said finished process control signal from said finishing end parallel inferential control loop to generate a total control signal for controlling said extended process at said beginning end thereof;

said first intermediate parallel inferential control loop comprising a first intermediate process model for the portion of said extended process preceding said first intermediate location, said total control signal being an input to said first intermediate process model for generating said first intermediate expected measurement signal for said first intermediate parallel inferential control loop; and said finishing end parallel inferential control loop comprising:

a finishing end process model for that portion of said extended process adjacent and preceding said finishing end of said extended process, said first intermediate expected measurement signal being cascaded to said finishing end process model for generating said finishing end expected measurement signal for said finishing end parallel inferential control loop; and a reset model for that portion of said extended process adjacent and preceding said finishing end of said extended process, said reset model receiving the difference between said first intermediate measurement and an expected first intermediate measurement signal of said first intermediate parallel inferential control loop as a reset input signal for generating said reset output signal.

11. A control system for controlling an extended process as claimed in claim 10 wherein said first intermediate parallel inferential control loop can be deactivated except for said first intermediate process model and generation of said reset input signal with said control system then being operated by said finishing end control loop.

12. A control system for controlling an extended process as claimed in claim 10 wherein said finishing end parallel inferential control loop can be deactivated with said control system then being operated by said first intermediate parallel inferential control loop, said finishing end parallel inferential control loop comprising a setpoint converter which is not deactivated for receiving said setpoint signal, converting said setpoint signal to an intermediate setpoint signal and said first intermediate parallel inferential control loop receiving said intermediate setpoint signal.

13. A control system for controlling an extended process including a process beginning end and a process finishing end, said control system comprising:

a plurality of parallel inferential control loops positioned at spaced locations ranging from said beginning end of said extended process to said finishing end of said extended process, each of said parallel inferential control loops comprising:

a process model corresponding to a portion of said extended process associated with said parallel inferential control loop for receiving a signal representative of control or a process model output preceding said portion of said extended process and for generating an expected measurement signal;

a first summer for receiving said expected measurement signal and a measurement signal from a sensor associated with said parallel inferential control loop and sensing said extended process at the location for said parallel inferential control loop, said summer generating a difference signal;

a reset model corresponding to said portion of said extended process for receiving a reset input signal from a parallel inferential control loop for controlling a preceding portion of said extended process and generating a reset output signal for decoupling control of said portion of said extended process from said preceding portion of said extended process;

a second summer for combining said difference signal and said reset output signal to generate a deviation signal;

a controller for receiving said deviation signal and a setpoint signal for said portion of said extended process to generate a loop control signal for said portion of said extended process; and a third summer for summing said loop control signal and a control signal representative of control of all parallel inferential control loops controlling succeeding portions of said extended process.

14. A control system for controlling an extended process as claimed in claim 13 wherein one of said parallel inferential control loops is located at said finishing end of said extended process.

15. A control system for controlling an extended process as claimed in claim 13 wherein each of said parallel inferential control loops can be turned on and turned off and further comprises:

apparatus for nulling said loop control signal to turn off said parallel inferential control loop;

apparatus for selecting said difference signal as a reset input signal for succeeding parallel inferential control loops when said inferential control loop is turned on and for selecting said reset output signal as a reset input signal for succeeding parallel inferential control loops when said parallel inferential control loop is turned off; and a setpoint converter for converting said setpoint signal for said portion of said extended process to a setpoint signal for a preceding portion of said extended process.

16. A control system for controlling an extended process as claimed in claim 13 wherein each of said controllers comprises:

a deviation filter for generating a filtered deviation signal;

a setpoint shaping filter for generating a shaped setpoint signal;

a fourth summer for combining said filtered deviation signal and said shaped setpoint signal to generate an inferential signal; and an inferential compensator responsive to said inferential signal for generating said loop control signal.

17. A method for controlling an extended process including a process beginning end and a process finishing end by means of a plurality of parallel inferential control loops, said method comprising the steps of:

generating actual measurement signals for spaced locations ranging from said beginning end of said extended process to said finishing end of said extended process, said spaced locations each corresponding to one of said plurality of parallel inferential control loops;

generating expected measurement signals for said spaced locations of said extended process;

combining said actual measurement signals and said expected measurement signals to generate difference signals;

generating reset output signals representative of deviations compensated by preceding parallel inferential control loops;

combining said difference signals and said reset output signals to generate deviation signals;

combining said deviation signals with setpoint signals to generate control signals for each of said parallel inferential control loops; and combining said control signals to generate a total control signal for control of said extended process at said beginning end of said extended process.

18. A method for controlling an extended process as claimed in claim 17 wherein any one or more of said plurality of parallel inferential control loops can be deactivated, said method further comprising for each parallel inferential control loop which is deactivated, the steps of:

passing the reset output signal for the deactivated parallel inferential control loop to a succeeding parallel inferential control loop;

nulling the control signal for the deactivated parallel inferential control loop; and converting the setpoint signal for the deactivated parallel control loop to a setpoint signal for a preceding parallel inferential control loop.

* * * * *

UNITED STATES PATENT AND TRADEMARK OFFICE
CERTIFICATE OF CORRECTION

PATENT NO. : 5,715,158
DATED : Feb. 3, 1998
INVENTOR(S) : Shih-Chin Chen It is certified that error appears in the above-identified patent and that said Letters Patent is hereby corrected as shown below:

Equation in Claim 8, col.13, line 23, should read as follows:

$$M_i(s) = R_i(s) = [M_{+i}(s)][M_{-i}(s)]$$

Col. 13, line 26, In claim 8, patent reads "right=half" should read --right-half--.

Signed and Sealed this

Second Day of February, 1999

Attest:

Attesting Officer

*Acting Commissioner of Patents and Trademarks*